INVENTOR.
ARTHUR J. NELSON
BY
Naylor & Neal
ATTORNEYS

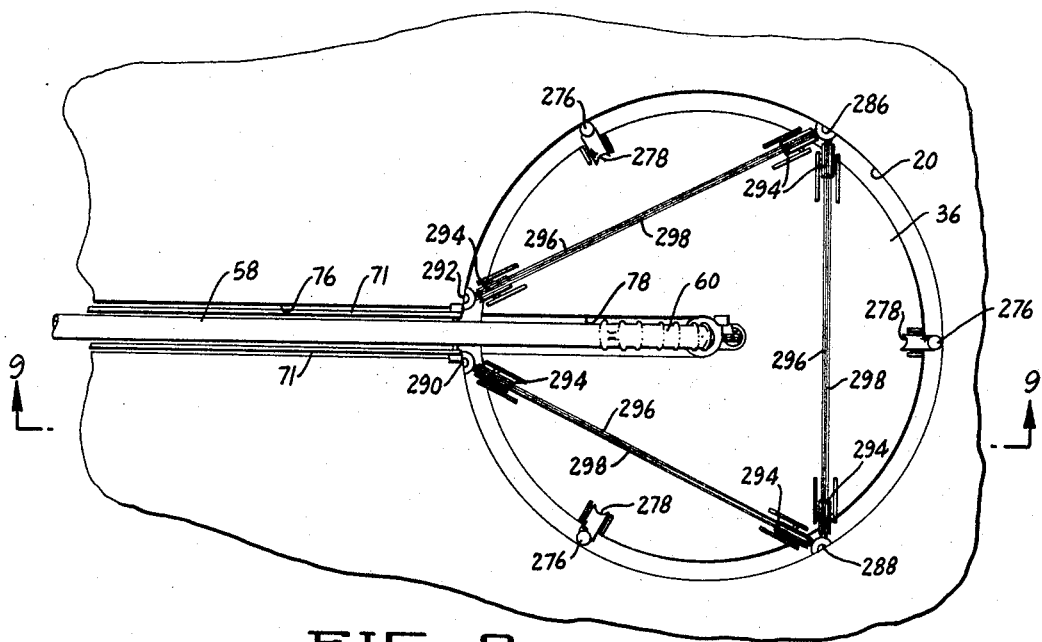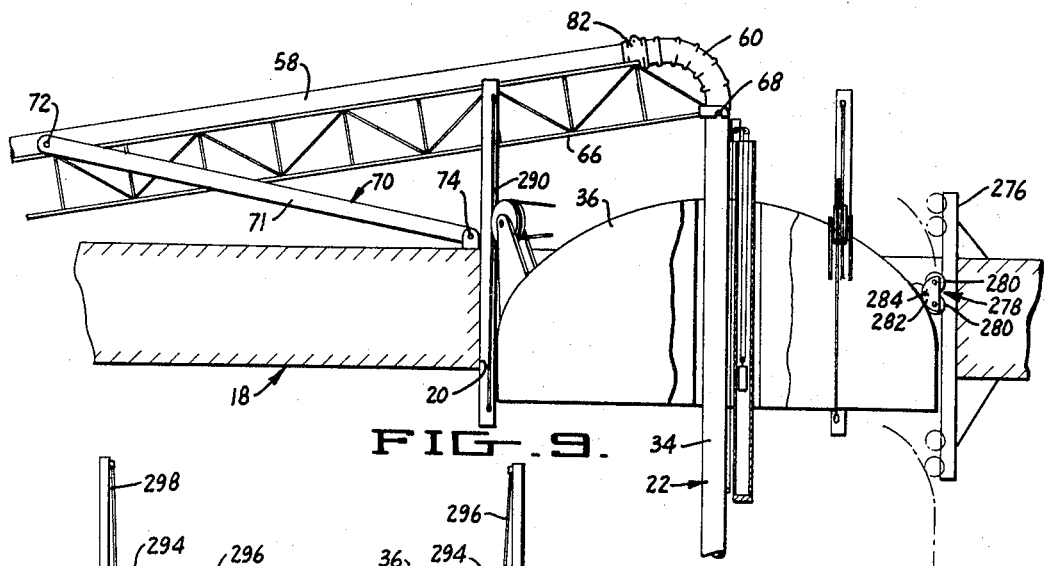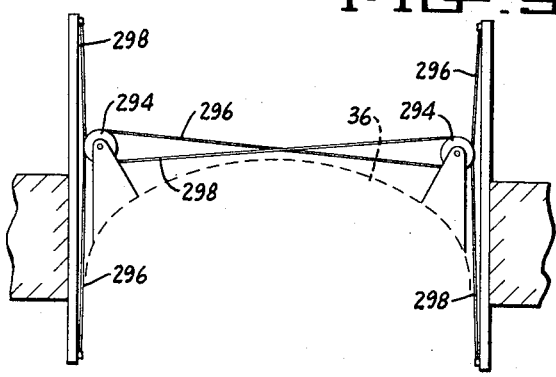

United States Patent Office 3,429,062
Patented Feb. 25, 1969

3,429,062
DEEP WATER HARVESTING SYSTEM
Arthur J. Nelson, Santa Barbara, Calif.
(1998 Broadway, San Francisco, Calif. 94109)
Filed Mar. 11, 1966, Ser. No. 533,623
U.S. Cl. 37—57                                            22 Claims
Int. Cl. E02f 3/94, 3/88, 3/90

ABSTRACT OF THE DISCLOSURE

This apparatus comprises a harvester for gathering and size classification of aggregate disbursed on the floor of a body of water, and recovery of the aggregate to a receptacle by a transfer means designed to be unhampered by turbulent action of a disturbed sea surface.

The harvester is buoyantly supported with monitoring and control means to automatically adjust its position responsive to depth and undulations in the floor for a maintained degree of penetration in said floor. Furthermore, the harvester elements are articulatively connected to flex in response to irregularities for contiguous contact with said floor. The transfer means is varied: when all gathered material is sought then simple application of a pump suction provides the feed for said transfer; when undesirable fines would be entrained, then a secondary classifier is employed propelling the accumulated material for a sufficient confining trajectory through the open water body. The heavier sought aggregate is collected for feed to a jet pump with clear pressure water secured from a source free of contamination. The uncollected fines fall free into the trail of the advancing harvester. Crushers are employed to recover material that is rejected because of excessive size. Means are provided to assure level of the apparatus and, in the event of power failure, discharge of the piping to prevent back flow into the pumping apparatus.

---

The present invention relates to a system for ocean dredging and, more particularly, is directed to such a system whereby aggregate material may be procured from the ocean floor at great depths. The invention is especially concerned with a system to continuously direct material procured from the floor of the ocean to a collection station located remote from the area of the ocean floor from which the material is procured. The invention is also, naturally, concerned with the specific elements employed in the system.

In recent years, it has become increasingly evident that underwater working techniques must be developed to take advantage of the many resources found at sea. To date, however, no commercially effective techniques have been developed to effect the large volume recovery of resources found on the floor of the ocean. The absence of such recovery techniques is believed to have resulted primarily because of the extreme difficulties encountered. Naturally, this absence may also be attributed, to some extent, to industry's preoccupation with the recovery of subterranean petroleum deposits from beneath the floor of the ocean.

The prime difficulty in providing a system to recover resources from the floor of the ocean is that of coping with the extreme depths encountered. This difficulty is accompanied and aggravated by numerous related difficulties, such as: irregularities in the ocean floor; adverse ocean surface conditions resulting from wind, wave and tidal action; and, extreme pressure environments. In addition to these difficulties, the recovery of resources from the ocean floor also presents problems of resource segregation and conveyance. The latter problems are especially important from a practical standpoint since, to be economically feasible, it is necessary that undesired resources be segregated prior to conveyance and that effective and efficient conveyance techniques be provided.

It is, accordingly, a principal object of the present invention to provide a system for procuring resources from the floor of the ocean, or other deep bodies of water, which effectively copes with the afore-enumerated difficulties and problems.

Another object of the invention is to provide specific apparatus for use in this system.

Yet another, and more specific object of the invention is to provide a system effecting optimum recovery of resources from the floor of the ocean.

Still another object of the invention, related to the latter object, is to provide a system incorporating apparatus adapted to condition material encountered thereby on the ocean floor for conveyance to a collection station.

A further object of the invention is to provide a system capable of operation under varying conditions and facilitated for interrupted operation which may result from these conditions.

In its more basic aspects, the system of the present invention may be defined as a series of interrelated elements adapted to effect the selective collection of aggregate materials from the floor of a body of water and the conveyance of this material to a remote collection station. The basic system comprises: a harvester adapted to ride over the floor of the body of water and collect aggregate material therefrom; a pump operatively associated with the harvester to exhaust aggregate material collected thereby; and, conduit structure to receive aggregate material exhausted by the pump and direct this material to a remote collection station. In its more specific aspects, the system includes ancillary buoyant support structure for the conduit and control devices to effect the selective and optimum operation of the various system elements.

Although the present invention is characterized primarily as a system comprised of combined elements, it is to be understood that the invention encompasses both the system and the elements combined therein.

The foregoing and other objects and the specific characteristics of the present invention will become more apparent when viewed in light of the following detailed description and accompanying drawings, wherein:

FIG. 8 is a plan view illustrating the interrelationship between the barge and stabilizing support pontoon incorporated into the inventive system;

FIG. 9 is a sectional view, with parts thereof broken away for the sake of clarity, taken on the plane designated by line 9—9 in FIG. 8; and, FIG. 10 is an elevational view diagrammatically illustrating the level maintaining structure cooperating between the stabilizing pontoon and barge shown in FIGS. 8 and 9.

Overall system

Figure 1:
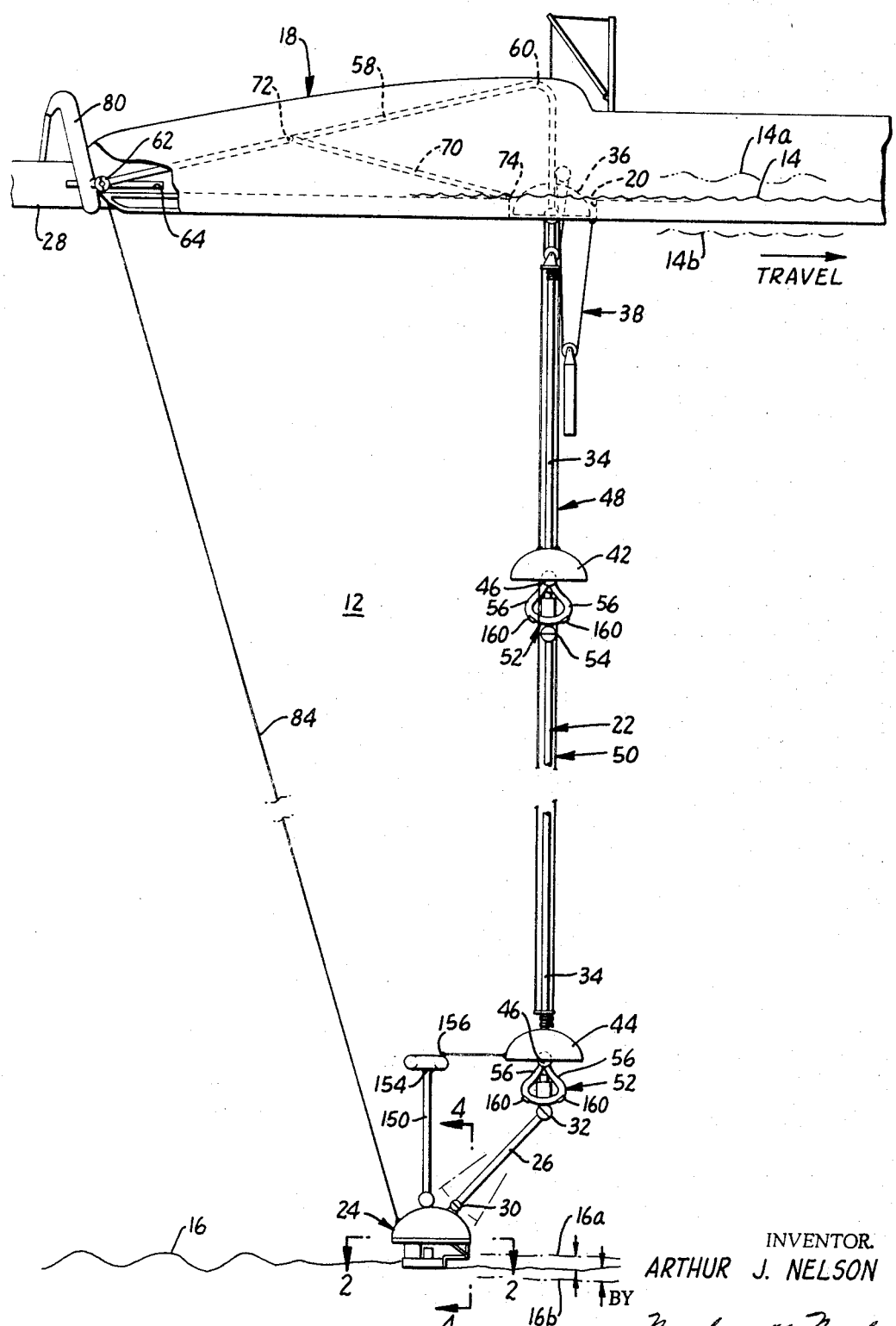
FIG. 1 is an elevational view, partially in section, illustrating the overall arrangement of an embodiment of the inventive system.

Referring now to FIG. 1, therein is illustrated the overall system of the invention employed in a body of water 12 having a surface 14 and a floor 16. Phantom lines 14a and 14b to either side of the surface 12 represent variations which may occur as the result of tidal, wind or wave action. Phantom lines 16a and 16b to either side of the floor 16 represent variations in the elevation of the floor which may result from irregularities or undulations in its surface.

The system illustrated in FIG. 1 basically comprises: a barge 18 buoyantly supported on the surface 14 and having extending therethrough in open communication with the body 12 a well 20; a conduit string 22 extending from the barge 18 to a position slightly above the floor 16; a harvester 24 disposed adjacent the lower end of the conduit string 22 in proximate contact with the floor 16; and, a conduit arm 26 articulatively connected at its ends to the conduit string 22 and the harvester 24 to establish fluid communication therebetween. Although not illustrated in detail, it is to be understood that the barge 18 is provided with power generating equipment, hoisting booms and other handling equipment, various appurtenances typically used for dredging operations and, storage space to accommodate various components of the dredging or harvesting apparatus. Preferably, the barge is sufficient in itself, to perform and undertake complete installation, operation and servicing of the harvesting system. Towing tugs, however, ordinarily provide for mobility of the barge and separate barging services receive dredged material after it has been processed by the system and deliver all supplies. A material receiving barge, designated by the numeral 28, is partially illustrated in FIG. 1 as being moored alongside the barge 18.

The harvester 24 is designed to bear on the floor 16 and comb through deposits thereon to intercept aggregate material for selective yield to the conduit arm 26. The detailed structure to accomplish these operations will be developed in the subsequent discussion. From this discussion, it will be seen that the operation of the harvester eliminates needless handling of waste and avoids unnecessary contamination of the yield product with unconsolidated fines that may remain in suspension in the body of water. The latter characteristic is particularly desirable, since it avoids the expense of both transporting and processing such fines.

The inclined conduit arm 26 is secured between the harvester 24 and conduit string 22 by ball joints 30 and 32, respectively. Thus, the arm is free to oscillate to provide maintenance of the harvester on the floor 16, without disturbing the elevational position of the conduit string 22, as the floor contour varies. The manner in which the arm 26 oscillates responsive to changes in the contour of the floor 16, as designated by the lines 16a and 16b, is represented by the phantom center line of the conduit 26 shown to either side of the solid line representation thereof in FIG. 1.

The conduit string 22 is comprised of a series of substantially equal length sections assembled to a cumulative length sufficient to reach the depths to be encountered. The sections of the conduit string, designated by the numeral 34, are buoyantly supported by a support system corresponding to that disclosed in my co-pending application, Ser. No. 533,627, filed Mar. 11, 1966, now Patent No. 3,359,741. This support system comprises: a stabilizing pontoon 36; a crane mechanism 38 supported on the pontoon 36; vertically spaced intermediate pontoons 42 and 44 disposed beneath the stabilizing pontoon 36 and secured in supporting relationship to the conduit sections thereabove by ball joints 46; first tension cable and equalizing structure 48 secured between the tail block of the crane mechanism 38 and the intermediate pontoon 42; and, second tension cable and equalizing structure 50 secured between the intermediate pontoon 42 and the intermediate pontoon 44. The detailed structure and operation of this support system is disclosed in my aforementioned Patent No. 3,359,741. From the disclosure of that application, it will be seen that each pontoon supports a share of the conduit string weight in such a manner as to avoid the creation of upward support forces under all conditions. This characteristic is important, since the conduit sections 34 are too slender to resist any appreciable degree of compression. From the co-pending application it will also be seen that the support system provides for the positioning of the conduit string 22 at an absolute elevation relative to the floor 16 and that this elevation is selectively changeable and automatically maintained at adjusted condition.

The conduit string 22 also has incorporated thereinto vertically disposed dual discharge centrifugal pumps 52 located beneath each of the intermediate pontoons 42 and 44. These pumps correspond to that disclosed in my Patent No. 2,933,837 and include a horizontal impeller and housing therefor provided with dual substantially opposed discharge openings. The upper pump 52 communicates with the conduit string 22 through a fluid communicating ball joint connection 54 between the impeller eye thereof and the lower conduit section 34 and Y-shaped discharge conduits 56 extending in fluid communication between the discharge outlets of the impeller thereof and the ball joint 46 secured to the lower end of the upper conduit section 34. The lower pump 52 is similarly connected between the lower conduit section 34 and the conduit arm 26 through means of connection of the impeller eye thereof in fluid communication with the ball joint 32 and connection of the discharge outlets thereof with the ball joint 46 thereabove through Y-shaped discharge conduits 56. In the preferred form, the impellers of adjacent pumps 52 are disposed to rotate in opposite directions in order to avoid twisting of the conduit string 22.

Discharge of material from the upper conduit section 34 is provided through means of a pivot pipe or conduit 58 secured in fluid communication therewith through a flexible elbow 60 (see FIG. 9). The conduit 58 is comprised of a rigid section and is supported at the end thereof opposite the elbow 60 through a ball joint 62 connected thereto and slidably received on a horizontal track 64 mounted on the barge 18. The ball joint 62 and track 64 are so interrelated that vertical movement therebetween is prevented and horizontal movement of the ball joint is restricted to a rectilinear path lying in the vertical plane defined by the conduit 58. The end of the conduit 58 secured to the elbow 60 is supported on the conduit section 34 through means of a truss 66 fixed to the conduit and a pivotal support connection 68 between the truss and the conduit section (see FIG. 9). The latter support is enhanced by a connection between the barge 18 and conduit 58 which assures that up and down movement of the elbow 60 will be maintained in a substantially rectilinear vertical path. This connection comprises a rigid beam 70 of approximately one-half the length of the conduit 58, pivotally secured at the upper end thereof to a point approximately mid-way between the ends of the conduit by a connection 72 for movement about a horizontal axis extending normal to the conduit and pivotally secured at the lower end thereof to the barge 18 by a connection 74 adjacent the well 20 for movement about a horizontal axis parallel to and spaced vertically from the axis of the connection 72. The beam 70, as can be seen from FIG. 8, is comprised of an opposed pair of side members 71 symmetrically disposed on either side of the conduit 58. In the preferred embodiment, the distance between the connections 72 and 74 is substantially equal to the distance between the ball joint 62 and the connection 72. It is through this geometry and the pivotal and sliding support connections of the conduit 58 that movement of the elbow 60 is constrained to a substantially rectilinear vertical path relative to the barge 18. At this point, it is also noted that vertical movement of the conduit 58 is facilitated by alley-ways 76 and 78 therefor provided, respectively, in the barge 18 and the stabilizing pontoon 36 (see FIG. 8).

Material discharged from the lower end of the conduit 58 may be received in any suitable collection station. In the preferred embodiment illustrated, a bucket elevator 80 mounted on the barge 18 and discharging laterally therefrom into the barge 28 is shown receiving this material. To assure that material in the conduit 58 will not be drawn into the conduit string 22 in the case of power failure, or other disruption in pumping service, a check valve 82 is provided in the conduit adjacent to elbow 60. This check valve is closed during normal pumping operation and opens when pressure drops responsive to an interruption in pumping service. In addition to serving to prevent backflow from the conduit 58, the check valve 82 also functions to break the vacuum which may be created in the conduit string 22 responsive to interruption in pumping service.

In the preferred operation of the inventive system, records of previous traverses of the area of the floor 16 to be dredged are plotted to determine dredging routes thereon of approximately constant depth. The system is then adjusted for dredging at this depth and the harvester is directed over the predetermined route. Preferably, the system is equipped with monitoring apparatus to visually and/or audibly sense the topography of the intended traverse route. The flexibility of the overall system provided by the condition responsive support system incorporated thereinto (i.e. that of my aforementioned Patent No. 3,359,741) and the flexibility of the harvester 24, to be developed subsequently, provide for appreciable variances in the contour of the floor 16. Attention is here directed to the fact that the conduit arm 26 is controllably associated with the support system in the manner disclosed in my aforementioned co-pending application. In addition, should the harvester be fouled by impassable protrusions on the floor 16, a cable 84 connected thereto and extending to a winch on the barge 18 may be utilized to facilitate the temporary raising thereof.

Although the conduit string 22 is illustrated as assuming a perfectly vertical position during operation of the harvester itself, it is noted that the string is actually curved due to drag of the harvester on the floor and resistance imposed by water friction. Should the curvature resulting from these factors become excessive, hydraulic thrusters may be provided to power the suspended apparatus and maintain the conduit string 22 in a more vertical position. Insofar as this application is concerned, however, the curvature is considered inconsequential to the operation of the system. Accordingly, although thrusters could conceivably be incorporated into the system, they will not be illustrated or described.

Harvester structure

The harvester 24 basically comprises a carriage supporting thereon various elements to facilitate its support and proximate contact with the floor of a body of water being worked and structure to facilitate the selective collection and conveyance of aggregate material from said floor. The carriage, designated in its entirety by the numeral 86, can best be seen in FIG. 6 and comprises a substantially planar member 88 defined by the lower surface of the pontoon structure secured thereto and forward and rearward frames 90 and 92, respectively, fixed to and depending from the member 88. The rearward frame 92 has fixedly supported thereon a suction pump 94 and a jet discharge pump 96. The forward frame 90 has flexibly secured thereto by articulated connections rearwardly extending links 98. These links are secured to and function to partially support a "grizzly" type raking structure 100 extending transversely across the harvester. The raking structure 100 is comprised of a series of transversely aligned segments 102 articulatively secured together by link connections 104 and arranged, through provision of the links 98, to present a convex forward face. Secondary links 106 and 108 are articulatively secured to the linking segments 102 to either side of the harvester center line and extend rearwardly from the raking structure in substantially axial alignment with the links 98 disposed to either side of said center line. The links 106 and 108 are articulatively secured at the rearward ends thereof to a flexible hoe structure 110 to support said structure in a position presenting a substantially concave forward face. The hoe structure 110 is comprised of relatively straight segments defined by articulatively interconnected planar elements 112 to either side of the harvester center line and a curved planar element 114 articulatively interconnecting these segments.

The links 106 and 108 to either side of the harvester center line have extending therebetween and articularly secured thereto transverse links 116. The links 116, together with a continuous cable 118 secured thereto and extending therebetween over a pair of sheaves 120 mounted on the planar member 88, provide for flexible support of the links 106 and 108 on the harvester carriage. Naturally, the rake and hoe structures also obtain some support from the floor of the body of water over which the harvester is riding. In the case of the rake structure, the latter support is relatively slight, since the area of the rake adapted to contact the floor of the body of water is very small. The hoe structure, however, obtains considerable support from the floor of the body of water over which the harvester is riding through the provision of extended area floor contacting skids 122 fixed thereto.

Figure 2:
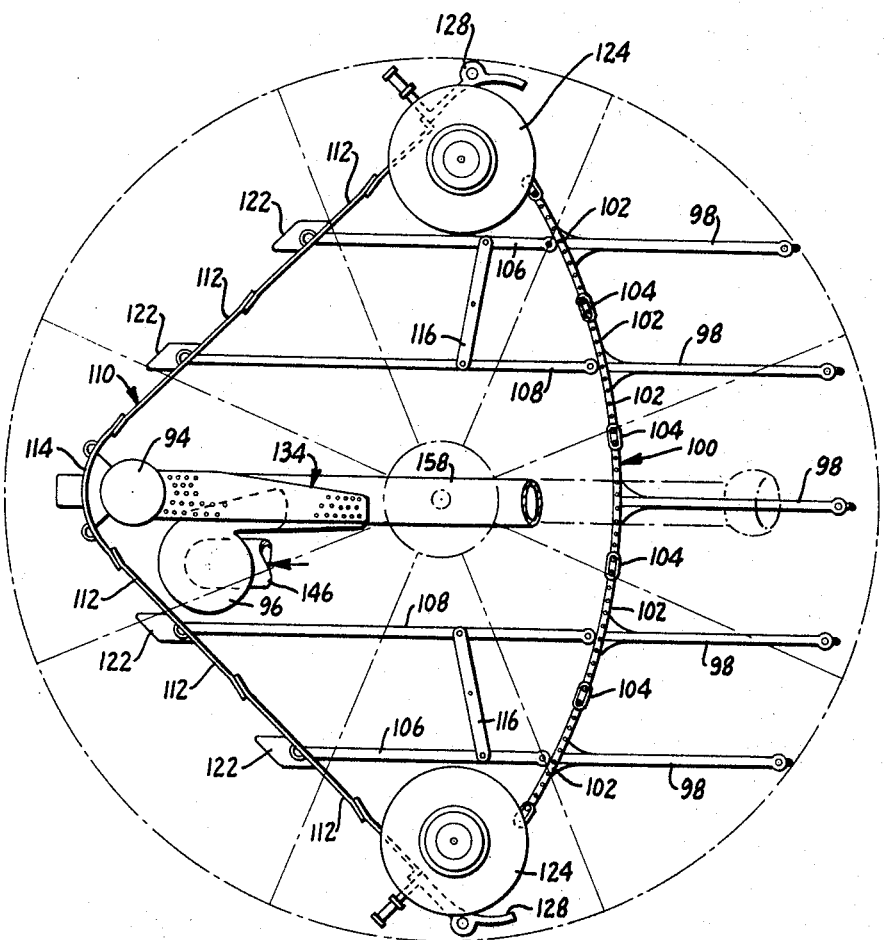
FIG. 2 is an enlarged sectional view taken on the plane designated by line 2—2 in FIG. 1.

Through the provision of the aforedescribed rake and hoe structure and the support means therefor, the harvester 24 is adapted to effect the selective collection of aggregate material encountered thereby as it moves forward (i.e. to the right as viewed in FIG. 2) over the floor of a body of water. Specifically, during such movement, material of a predetermined size or less encountered by the rake structure passes therethrough to the hoe structure where it is collected at the rearmost apex portion thereof. Preferably, the elements 112 of the hoe structure are perforated (see FIG. 6) to a degree facilitating the passage of undesirable fine material therethrough.

As the rake and hoe structures pass over minor irregularities in the floor of a body of water, the articulatively connected portions thereof flex to provide for continuous contact of their lower edge portions with the floor. Upon encountering inclined surfaces of a considerable degree, the links 106 and 108 may also flex about their articulatively connected portions to facilitate such continuous contact. This latter movement may also take the form of simultaneous raising and lowering of the links 116 to opposite sides of the harvester longitudinal center line. The latter occurrence takes place naturally, since the continuous cable 118 functions to lower one of the links 116 upon raising of the other, and vice versa.

The convex leading face on the raking structure 100 also functions to direct oversized aggregate material encountered thereby laterally to either side of the harvester and into rock crushers 124 supported on the carriage through a suspended connection technique similar to that used for the links 116. Specifically, the crushers 124 are mounted on the carriage through means of a continuous cable secured thereto and extending therebetween over sheaves 126 mounted on the planar member 88. Through this arrangement, the crushers 124 are flexibly mounted to assume positions in substantially continuous contact with the floor of a body of water over which the harvester is riding. Furthermore, the raising or lowering of one of the crushers 124 upon the encountering of an inclined surface functions to impart an opposite raising or lowering compulsion to the other crusher, and vice versa. Upon the directing of oversized aggregate material to the crushers 124, this material is crushed to a size which would normally pass through the raking structure and then directed rearwardly to the concave side of the hoe structure. The latter directing is facilitated by guides 128 adjustably secured to the crushers 124 to act as continuances of the outermost planar elements 112.

Figure 6:
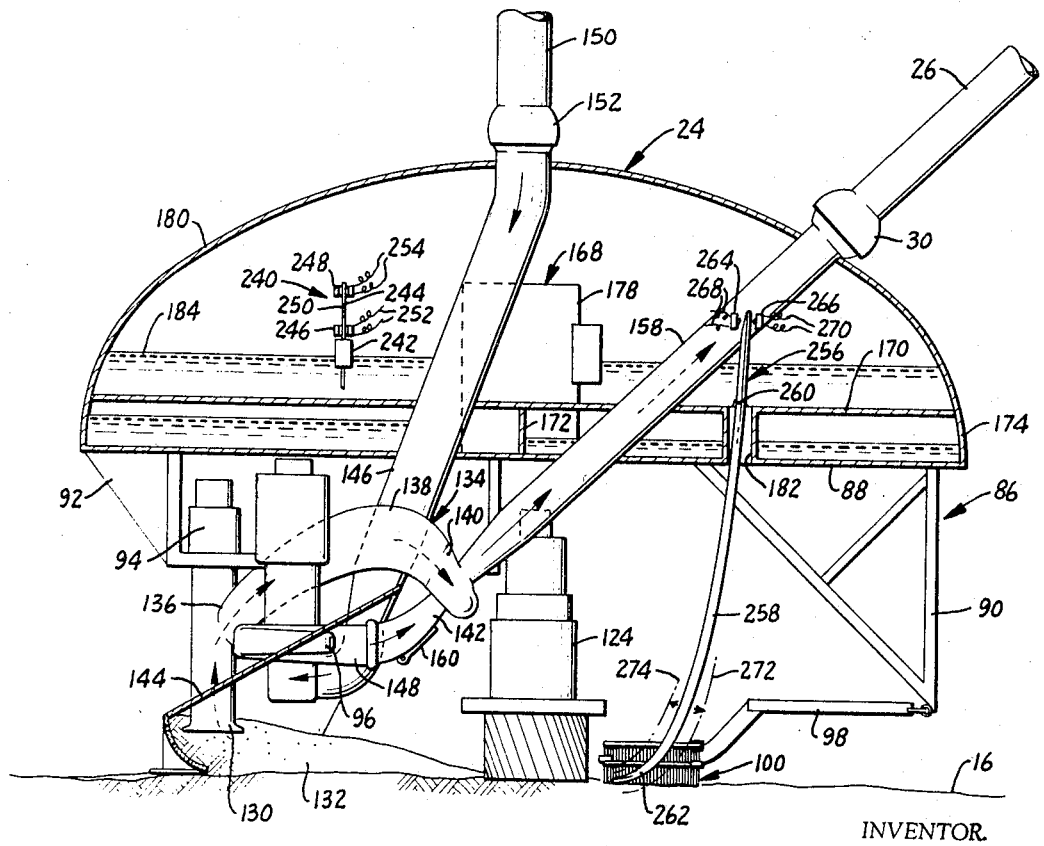
FIG. 6 is a sectional view, with parts thereof omitted for the sake of clarity, taken on the plane designated by line 6—6 in FIG. 4.

Referring again to the suction pump 94, from FIG. 6 it is seen that this pump includes an inlet portion 130 disposed slightly ahead of the rearmost portion of the hoe structure 110 to suck up aggregate material, designated by the numeral 132, collected ahead of the hoe structure. After being sucked up by the pump 94, the aggregate material is discharged through the outlet of the pump into a trajectory housing 134 defined by an inlet end 136 in fluid communication with the discharge opening of the suction pump 94; a curved intermediate portion 138 perforated or open on its lower side and closed on its upper side; and, a discharge end 140 in fluid communication with the charging opening of a venturi type jet pump 142 cooperating with the discharge pump 96. The discharge end of the trajectory housing 134 and the charging opening of the jet pump 142 combine to form a hopper like structure facilitated for the collection of aggregate material which is thrown through the housing by the suction pump 94. The prime purpose of the trajectory housing 134 is to provide for the separation and disposal of undesirable fine material collected in the hoe structure 110 prior to its conveyance by the jet pump 142. This is accomplished by forming the housing with a lower side either entirely open to the body of water in which the harvester is employed or perforated to a degree facilitating the passage of such undesirable fine material therethrough. In addition to forming the lower side of the trajectory housing in an open or perforate manner, it may also be desirable to perforate the upper portion of the trajectory housing for the same purpose. To prevent undesirable fine material separated in the trajectory housing from again collecting ahead of the hoe structure 110, a deflecting shield or cowl 44 extends beneath the housing at a position where it will direct such fine material to the rear of the harvester.

In the preferred embodiment illustrated, the discharge pump 96 is of the centrifugal type and includes a suction inlet 146 adapted to communicate with a clean portion of the body of water in which the harvester is employed and a discharge outlet 148 communicating with the jet pump 142. The function of the suction inlet 146 is accomplished through means of a conduit 150 secured in fluid communication therewith by a ball joint 152. The conduit 150 is of a length sufficient to extend beyond the area of water contaminated by normal operation of the harvester and is open for water inlet only at its extreme outer end portion 154. To optimize operation of the conduit 150, a float 156 is secured to the end portion 154 to maintain the conduit in a substantially vertical condition.

Figure 7:
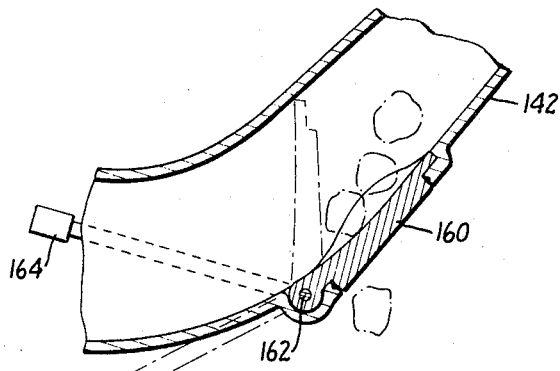
FIG. 7 is a sectional view taken on the plane designated by line 7—7 in FIG. 4.

The jet pump 142 is ideally operated so that the pressure at the charging end thereof connected to the discharge end 140 of the housing 134 is in excess of the ambient pressure of the body of water therearound. Thus, the jet pump tends to eject undesirable fine materials and further facilitate the separation process. At this point it is noted that after entry into the charging inlet of the jet pump 142, aggregate material is pumped therefrom along with relatively clean water through a conveying conduit 158 mounted on the carriage 86 and secured at the outer end thereof in fluid communication with the conduit arm 26 through the ball joint 30. It is here also noted that the jet pump 142 incorporates thereinto relief means to prevent the passage of aggregate material to the centrifugal discharge pump 96 in the event of an interruption in its operation. This relief means is best illustrated in FIG. 7 and simply comprises a segment 160 mounted in the lower outer radius formed in the section of the jet pump leading to the charging inlet thereof. The segment 160 is mounted in an opening provided in this section for pivotal movement about a hinge 162 disposed substantially normal to the section. The hinge 162 is disposed at the upstream end of the segment and is counterbalanced by a weighted arm 164 adapted to urge the segment to the open phantom line position illustrated in FIG. 7 upon an interruption in the pressure supply to the jet pump. When the segment 160 assumes the open condition, aggregate material is discharged from the opening provided thereby and prevented from returning to the centrifugal discharge pump 96. The weighted arm 164 and segment 160 are also designed to automatically effect closing of the segment to the solid line position illustrated in FIG. 7 upon the assumption of normal operating pressure by the discharge pump 96.

Although not illustrated in detail, each of the discharge conduits cooperating with the pumps 52 in the conduit string 22 is also provided with relief segments 160 corresponding to that incorporated into the jet pump 142. These segments also act as safety contrivances to prevent the return of aggregate material to the pumps 52 in the event of an interruption in their operation. In addition to performing this safety function, it should also be appreciated that the segments 160 decrease the starting load of the pumps upstream thereof and facilitate pump priming. The segments 160 additionally act as readily replaceable wear sections.

Figure 3:
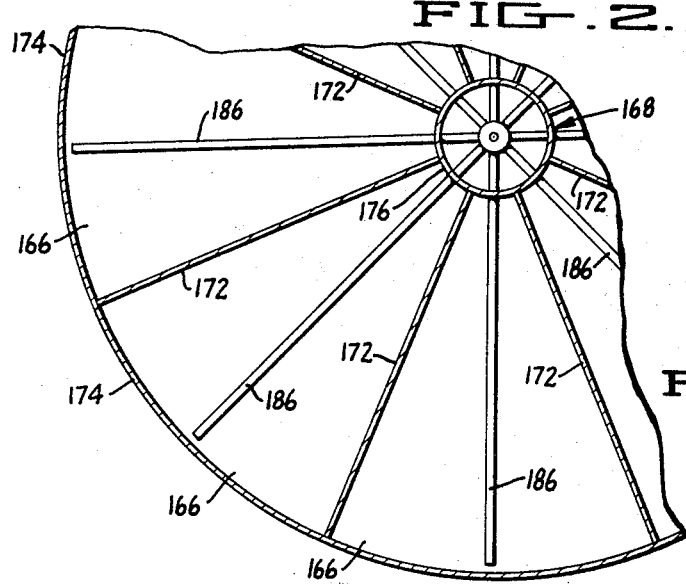
FIG. 3 is a partial plan sectional view taken on a plane slightly above that of FIG. 2, showing the balancing tanks incorporated into the inventive harvester.
Figure 4:
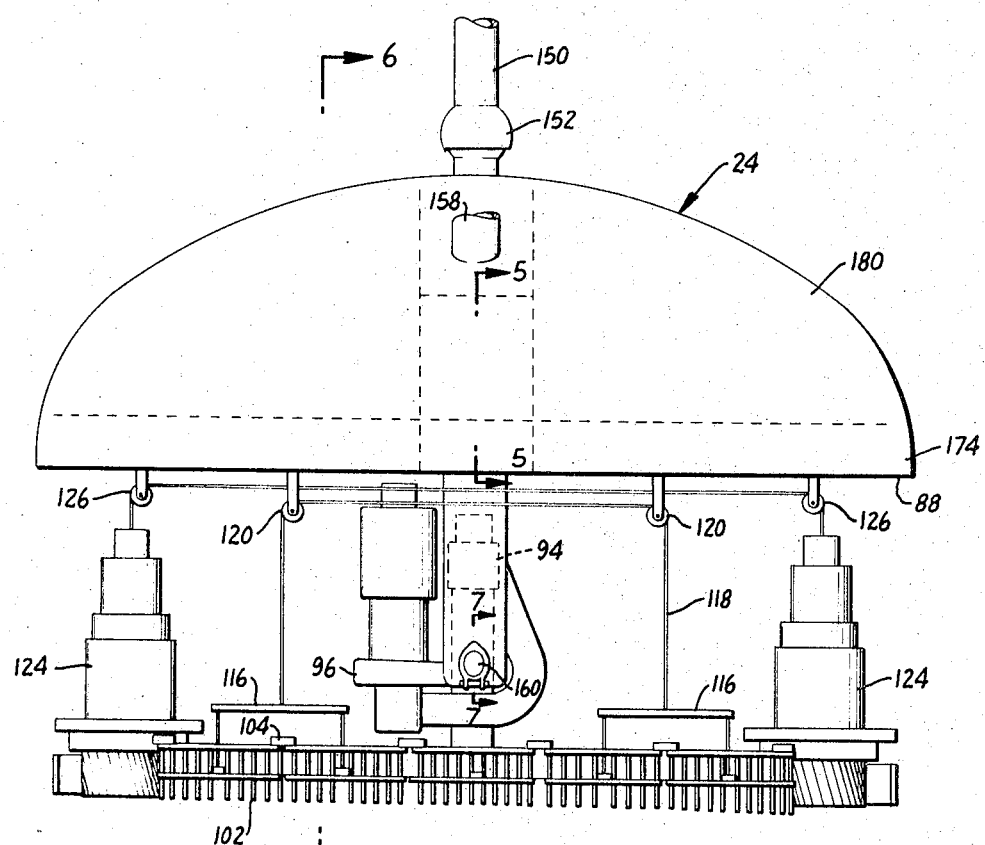
FIG. 4 is a sectional view, with parts thereof omitted for the sake of clarity, taken on the plane designated by line 4—4 in FIG. 1.

The harvester also includes pontoon and ballast levelling structures supported on the carriage 86 above the planar member 88. The ballast levelling structure comprises a series of pie-shaped tanks 166 disposed around the midpoint of the harvester and a level sensing and mass distribution device 168 located centrally of the harvester. From FIGS. 3 and 6, it can be seen that the tanks 166 are defined by the planar member 88, a planar member 170, radially extending partitions 172, an outer annular wall 174 and an inner annular wall 176. The inner annular wall 176 forms part of a reservoir 178 incorporating into the level sensing and mass distribution device 168. The detailed construction and operation of the latter device will be developed hereafter under the heading "Harvester Control System."

The pontoon structure on the carriage 86 simply comprises a dome-shaped wall 180 of substantially hemispherical configuration formed contiguous with the outer annular wall 174 to define an inverted cup-shaped vessel. The vessel so defined is adapted to assume open fluid communication with a body of water in which the harvester is employed through means of passages extending through the planar members 88 and 170. One of these passages is designated by the numeral 182 in FIG. 6. The upper surface of the vessel is, however, sealed against the flow of fluid therethrough. This condition is established by forming the wall 180 of imperforate material and by providing sealed connections between the wall and all elements extending therethrough, such as the suction inlet 146 and the conveying conduit 158. The vessel thus provided is adapted to entrap therein a select volume of gaseous medium. Specifically, this medium is confined between the wall 180 and the surface of the water, designated by the numeral 184, permitted to enter the vessel through the open lower side thereof. From the subsequent discussion, it will be seen that the harvester is provided with condition responsive control structure to vary the volume of gaseous medium entrapped in the vessel and, thus, vary the amount of buoyant support imparted to the harvester by the pontoon structure.

*Harvester control system*

Figure 5:
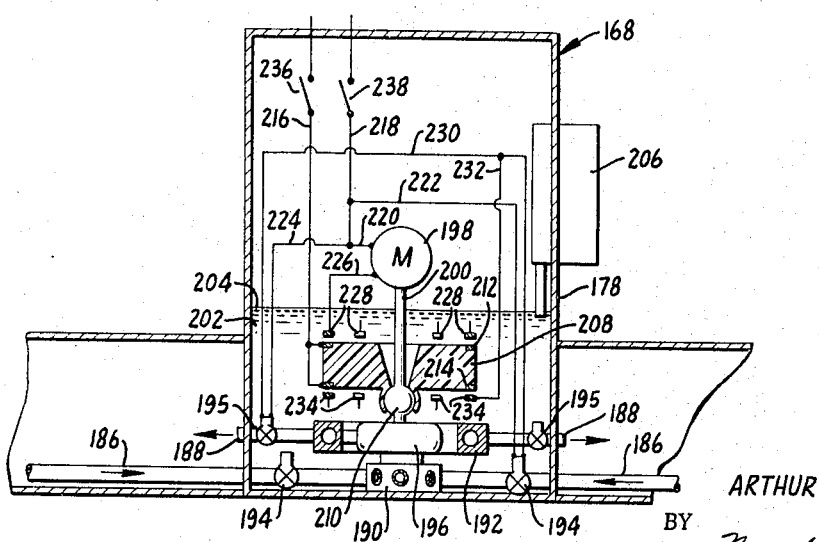
FIG. 5 is a sectional view taken on the plane designated by line 5—5 in FIG. 4, including a schematic representation of the electrical and fluid circuitry incorporated into the control structure for the balancing tanks in the inventive harvester.

Levelling control of the harvester 24 is effected through operation of the level sensing and mass distribution device 168 and the tanks 166 cooperating therewith. This operation can best be appreciated from observation of FIGS. 3 and 5, wherein the internal characteristics of the tanks 166 and the device 168 are illustrated. From these figures it is seen that each of the tanks 166 has extending thereinto an elongated suction pipe 186 and a short discharge pipe 188. Each of these pipes has an open outer end in fluid communication with the tank into which it extends. The inner ends of the pipes 186 and 188 are secured, respectively, in fluid communication with manifolds 190 and 192 and have interposed therein solenoid operated shut-off valves 194 and 195. The manifolds 190 and 192 are, in turn, secured in fluid communication with the inlet and outlet sides, respectively, of a centrifugal pump 196. The centrifugal pump 196 is driven by an electrically operated motor 198 coupled thereto by a drive shaft 200.

The reservoir 178 has contained therein a non-corrosive and substantially non-conductive liquid 202 maintained at a predetermined level 204 by a barometer type make up tank 206. The level 204 is so maintained as to always be beneath the motor 198 and above a float 208 mounted on the pump 196 for universal movement by a ball joint 210. Through this arrangement, the float 208, which is annular in configuration and disposed around the shaft 200, is always maintained in a horizontal disposition, regardless of the attitude assumed by the harvester. Thus, the angular deviation of the float 208 relative to the carriage fixed components of the harvester serves as an indication of the harvester's attitude.

It is through the monitoring function provided by the latter indication that condition responsive balancing control is effected. This control is provided through means of electrical circuitry comprising: electrically conductive upper and lower annular contact rings 212 and 214, respectively, secured to the float 208; a first main electrical power lead 216 connected to each of said rings; a second main electrical power lead 218 connected to one side of the electric motor 198 by a lead 220 and to one side of each of the solenoid valves 194 and 195 by leads 222 and 224, respectively; a plurality of leads 226 (only one of which is illustrated) connected between the motor 198 and contacts 228 fixed relative to the reservoir 178 at positions adapted to contact the ring 212 upon deviation of the reservoir from an upright condition; a plurality of leads 230 (only one of which is illustrated) connected between each set of oppositely disposed solenoid switches 194 and 195; and, a plurality of leads 232 (only one of which is illustrated) connected, respectively, between each of the leads 230 and a contact 234 mounted on the reservoir 178 in a position wherein it is adapted to make electrical contact with the ring 214 upon tilting of the reservoir relative to the float 208. The main power leads 216 and 218 have interposed therein selectively operable switches 236 and 238, respectively, which are normally maintained in closed condition. The contacts 228 and 234 correspond in number to the tanks 166 and are each aligned, radially, with one of said tanks. Furthermore, each contact 234 is connected, through the leads cooperating therewith, with the solenoid valves 194 and 195 radially aligned therewith. The connection of the contacts 234 is also so arranged that engagement and disengagement of a contact 234 by the ring 214 effects, respectively, opening and closing of the valves 194 and 195 cooperating therewith.

In operation, tilting of the reservoir 168 responsive to changes in the attitude of the harvester 24 functions to effect selective simultaneous engagement of opposed contacts 228 and 234 by the rings 212 and 214, respectively. Due to the location of the contacts, this engagement effects the uppermost contact 228 and the lowermost contact 234. Engagement of a contact 228 completes the circuit to the motor 198 and, thus, powers the pump 196 to create suction pressure in the manifold 190 and discharge pressure in the manifold 192. The engagement of a contact 234 simultaneously with the engagement of a contact 228 functions to complete the circuit and effect opening of the lowermost valve 194 and the uppermost valve 195. Thus, the pump 196 functions to exhaust liquid from the lowermost tank 166 and exhaust liquid to the uppermost tank 166. It is here noted that the tanks 166 are filled to a predetermined partial extent with a non-corrosive ballasting fluid. The selective charging and discharging of this fluid from the opposed tanks through the aforedescribed control structure shifts the mass in the tanks 166 to effect condition responsive levelling of the harvester.

Control of the amount of buoyant support provided by the pontoon incorporated into the harvester is effected simply by admitting gaseous medium into the vessel defined by the wall 180 to either raise or lower the water level 184. In the preferred form, gaseous medium is supplied to the vessel by a supply arrangement corresponding to that disclosed in my aforementioned Patent No. 3,359,741. This arrangement has the advantage that the gaseous medium supplied to the vessel is compressed in stages. However, when the harvester is employed in shallow depths of water, it is conceivable that gaseous medium might be supplied to the pontoon vessel through any conventional arrangement.

The supply of gaseous medium to the pontoon of the harvester 24 is controlled both to maintain the harvester at a substantially constant buoyancy and to limit the degree to which the raking structure 100 penetrates the floor of a body of water in which the harvester is employed. Maintenance of the pontoon at a substantially constant buoyancy is controlled by a float switch device 240 mounted in the pontoon. This device simply comprises: a float 242 adapted to ride on the surface 184; a rod 244 secured to the float for free vertical rectilinear movement therewith; a pair of vane operated magnetic switches 246 and 248 mounted around the rod 244 for operation by a vane 250 mounted on the rod; first electrical control circuitry 252 connected to the switch 246 to effect the discharge of gaseous medium from the pontoon responsive to closing of the switch 246 by the vane 250; and, second electrical control circuitry 254 secured to the switch 248 to effect the charging of gaseous medium into the pontoon reponsive to closing of the switch 248 by the vane 250. Although not illustrated, it is to be understood that the circuitries 252 and 254, respectively, are connected to suitable discharging and charging devices, such as vent valves and pumps as disclosed in my aforementioned Patent No. 3,359,741, and that conduit means extend from these devices into the harvester pontoon. Through the operation of the device 240, and the selective charging and discharging of gaseous medium from the harvester pontoon thereby, the level 184 is maintained within predetermined limits. The maintenance of the level 184, naturally, functions to establish the buoyancy of the harvester pontoon.

The degree to which the raking structure 100 penetrates the floor of a body of water in which the harvester is employed is controlled through a device designated in its entirety by the numeral 256. The device 256 comprises: an arm 258 mounted on the harvester carriage for pivotal movement about an axis 260 extending substantially normal to the forward direction of travel of the harvester and having a rounded lower end portion 262 adapted to ride over the floor of a body of water in which the harvester is employed; a first contact switch 264 mounted on the carriage to one side of the arm 258 for activation thereby; a second contact switch 266 mounted on the carriage to the other side of the arm 258 for activation thereby; electrical control circuitry 268 connected to the switch 264 and wired in parallel with the circuitry 252; and, electrical control circuitry 270 connected to the switch 266 and wired in parallel with the circuitry 254. The arm 258 is adapted to swing to the positions indicated by the phantom lines 272 and 274, respectively, as the raking structure 100 either penetrates insufficiently, or excessively, into the floor of a body of water, such as the floor 16. This action results because the end portion 262 is adapted to ride over the floor, even though the raking structure 100 may be penetrating thereinto. In operation of the device 256, when the arm 258 swings to the position 272 indicating insufficient contact of the raking structure 100 with the floor of a body of water, the switch 264 is closed, thus venting gaseous medium from the harvester pontoon in a manner corresponding to that effected by the switch 246. Similarly, when the arm 258 swings to the position designated by the line 274, the switch 266 is closed, thus charging gaseous medium into the harvester pontoon in a manner corresponding to that effected by the switch 248. This action, naturally, controls buoyancy of the harvester pontoon simultaneously with that of the device 240 and maintains the degree to which the raking structure 100 penetrates the floor of a body of water within predetermined limits.

*Stabilizing pontoon aligning structure*

The stabilizing pontoon 36 is maintained concentrically of the well 20 in the barge 18 through means of guide and level support structure. The guide structure is provided to permit substantially unrestricted relative vertical movement between the stabilizing pontoon and the barge 18. This movement typically results from wind, wave, and tidal action on the barge. It is noted that the stabilizing pontoon 36 and the elements supported thereby are maintained at a relatively fixed elevation, whereas the barge is continuously subjected to changes in elevation. The level support structure is provided to maintain the stabilizing pontoon 36 and the hull of the barge 18 substantially horizontally level relative to each other irrespective of vertical movement therebetween. The operation of the level support structure assures effective operation of the guide structure through avoidance of cocking of the stabilizing pontoon 36 relative to the barge 18.

The guide structure between the stabilizing pontoon 36 and well 20 comprises: three (3) vertically disposed rails 276 of substantially cylindrical cross section fixed to the walls of the well 20 at equal annularly spaced locations around the pontoon; and, three (3) sets of roller followers 278 mounted on the stabilizing pontoon 36 for guiding engagement with the rails 276. The followers 278, as can be seen from FIG. 9, each comprise a pair of rollers 280 mounted for rotation on a support block 282, which block is, in turn, pivotally supported on the pontoon 36 for movement about a horizontal axis, 284. Through the articulated support provided for the roller followers 278 and arcuate rail engaging surfaces formed on each of the rollers 280 (see FIG. 8), effective guiding engagement of the followers with the rails is assured. This engagement provides for free relative elevational movement between the barge 18 and stabilizing pontoon 36 to the extremities indicated by the phantom line illustrations in FIG. 9.

The level maintaining structure between the barge 18 and stabilizing pontoon 36 is best seen from FIGS. 8 and 10 and comprizes: vertically disposed support elements or means 286, 288, 290 and 292 fixed to the well 20 at spaced locations around the stabilizing pontoon 36; vertically disposed sheaves 294 mounted on the stabilizing pontoon 36 adjacent each of the support elements or beams; and, first and second cables 296 and 298, respectively, extending between the adjacent support elements and beams and reeved around the sheaves 294 adjacent thereto. The support elements 286 and 288, respectively, and the set comprised of the elements 290 and 292 are spaced around the stabilizing pontoon at substantially equal annularly spaced locations. The elements 290 and 292 are disposed on either side of the alley-way 76 so as not to interfere with swinging of the pivot conduit 58. In the preferred form illustrated, it is also noted that the rails 276 are fixed to the well at locations substantially midway between the support elements to either side thereof, the cables 296 and 298 are each, respectively, secured at one end to connections at opposed ends of one of the beams between which they extend and at the other end to oppositely disposed connections at opposed ends of the other beams between which they extend. This interrelationship can best be seen from the diagrammatic illustration of FIG. 10. From this figure, it can also be seen that each of the cables 296 and 298 is trained over one of the sheaves engaged therewith and under the other of the sheaves engaged therewith so as to be maintained under continuous tension. To provide for the guiding thereby of a pair of cables, each of these sheaves 294 is formed with two (2) peripheral guide-grooves (not illustrated).

In operation, the levelling structure permits free relative elevational movement between the barge 18 and stabilizing pontoon 36. However, due to the interrelationship of the cables and sheaves, as illustrated in FIG. 10, each pair of opposed sheaves 294 mounted on the pontoon 36 is maintained horizontally level relative to the barge 18. Thus, through the provision of three (3) sets of opposed sheaves at equal annularly spaced locations around the pontoon, as can be seen from FIG. 8, the entire stabilizing pontoon 36 is maintained horizontally level relative to the barge 18.

Where it is desired to collect fine, as well as coarse material, the pump and trajectory housing structure on the harvester could be modified to omit those elements which effect segregation.

What is claimed is:
1. An apparatus for harvesting aggregate material from the floor of a body of water, comprising:
    (a) a carriage adapted to ride over the floor of a body of water;
    (b) raking means supported on said carriage to assume a position in proximate contact with the floor of a body of water over which said carriage is riding, said raking means being adapted to segregate therethrough aggregate material of a predetermined size or less encountered thereby as said carriage rides over the floor of a body of water;
    (c) collection means supported on said carriage to receive aggregate material segregated through said raking means;
    (d) propelling means adapted to discharge aggregate material received in said collection means;
    (e) pontoon means secured to said carriage to effect the buoyant support thereof, said means comprising a chamber of selectively variable buoyancy;
    (f) buoyancy monitoring means operatively associated with said chamber to sense the degree of buoyancy thereof; and,
    (g) buoyancy control means to vary the buoyancy of said chamber responsive to said buoyancy monitoring means to maintain said buoyancy within predetermined limits.
2. An apparatus for harvesting aggregate material from the floor of a body of water, comprising:
    (a) a carriage adapted to ride over the floor of a body of water;
    (b) raking means supported on said carriage to assume a position in proximate contact with the floor of a body of water over which said carriage is riding, said raking means being adapted to segregate therethrough aggregate material of a predetermined size or less encountered thereby as said carriage rides over the floor of a body of water;
    (c) collection means supported on said carriage to receive aggregate material segregated through said raking means;
    (d) propelling means adapted to discharge aggregate material received in said collection means;
    (e) pontoon means secured to said carriage to effect the buoyant support thereof, said means comprising a chamber of selectively variable buoyancy;
    (f) penetration monitoring means operatively associ- ated with said carriage to sense the degree to which said raking means penetrates the floor of a body of water over which said carriage is riding; and, (g) buoyancy control means to vary the buoyancy of said chamber responsive to said penetration monitoring means to maintain the degree to which said raking means penetrates the floor of a body of water over which said carriage is riding within predetermined limits.

3. An apparatus for harvesting aggregate material from the floor of a body of water, comprising:
(a) a carriage adapted to ride over the floor of a body of water;
(b) raking means supported on said carriage to assume a position in proximate contact with the floor of a body of water over which said carriage is riding, said raking means being adapted to segregate therethrough aggregate material of a predetermined size or less encountered thereby as said carriage rides over the floor of a body of water;
(c) collection means supported on said carriage to receive aggregate material segregated through said raking means;
(d) propelling means adapted to discharge aggregate material received in said collection means;
(e) pontoon means secured to said carriage to effect the buoyant support thereof, said means comprising a chamber of selectively variable buoyancy;
(f) buoyancy monitoring means operatively associated with said chamber to sense the degree of buoyancy thereof;
(g) penetration monitoring means operatively associated with said carriage to sense the degree to which said raking means penetrates the floor of a body of water over which said carriage is riding; and,
(h) buoyancy control means to vary the buoyancy of said chamber responsive to said buoyancy and penetration monitoring means to maintain, respectively, said buoyancy, and the degree to which said raking means penetrates the floor of a body of water over which said carriage is riding, within predetermined limits.

4. An apparatus for harvesting aggregate material from the floor of a body of water, comprising:
(a) a carriage adapted to ride over the floor of a body of water;
(b) raking means supported on said carriage to assume a position in proximate contact with the floor of a body of water over which said carriage is riding, said raking means being adapted to segregate therethrough aggregate material of a predetermined size or less encountered thereby as said carriage rides over the floor of a body of water;
(c) collection means supported on said carriage to receive aggregate material segregated through said raking means;
(d) propelling means adapted to discharge aggregate material received in said collection means;
(e) pontoon means secured to said carriage to effect the buoyant support thereof;
(f) level monitoring means operatively associated with said carriage to sense the horizontal disposition thereof;
(g) mass distribution means supported on said carriage to selectively shift weight from one part thereof to another; and,
(h) balancing means controllably associating said level monitoring means with said mass distributing means to effect operation of the latter to maintain said carriage in a substantially horizontal disposition.

5. An apparatus according to claim 4, wherein:
(a) said level monitoring means comprises:
(1) a reservoir supported on said carriage having confined therein a liquid; and (2) a float anchored in said reservoir beneath the level of the liquid confined therein;
(b) said mass distributing means comprises:
(1) a plurality substantially oppositely disposed tanks spaced annularly around said carriage in at least partially radially spaced relationship from the center thereof; said tanks having confined therein a weighting liquid; and,
(2) liquid distributing structure interconnecting said tanks operable, selectively, to transfer weighting liquid between substantially oppositely disposed tanks; and,
(c) said balancing means comprises:
(1) detectors to sense the angular disposition of said float relative to said carriage; and,
(2) activating devices coupled to said detectors to effect selective operation of said liquid distributing structure responsive to the angular disposition of said float sensed by said detectors.

6. An apparatus for harvesting aggregate material from the floor of a body of water, comprising:
(a) a carriage adapted to ride over the floor of a body of water;
(b) means to move said carriage in a direction riding over the floor of a body of water in forward direction;
(c) raking means supported on said carriage to assume a position in proximate contact with the floor of a body of water over which said carriage is riding, said raking means being adapted to segregate therethrough aggregate material of a predetermined size or less encountered thereby as said carriage rides over the floor of a body of water and comprising a grid extending across a forward portion of said carriage, said grid being disposed to assume contact with the floor of a body of water over which said carriage is riding;
(d) collection means supported on said carriage to receive aggregate material segregated through said raking means, said collection means comprising a hoe extending across said carriage rearwardly of said grid, said hoe being disposed to assume contack with the floor of a body of water over which said carriage is riding;
(e) propelling means adapted to discharge aggregate material received in said collection means, said means comprising a suction pump having an inlet disposed to draw aggregate material collected in said hoe and an outlet disposed to discharge said aggregate material therefrom through a trajectory;
(f) an elongated trajectory housing mounted on said carriage to guide the aggregate material discharged from said suction pump, said housing having:
(1) an inlet at one end thereof disposed in receiving relationship to the outlet of said suction pump;
(2) an outlet at the other end thereof; and,
(3) a perforate trajectory confining portion disposed between the inlet and outlet thereof;
(g) a conveying pump supported on said carriage and having a charging inlet in fluid communication with the outlet of said trajectory housing and a discharging outlet; and,
(h) a conveying conduit supported on said carriage and having an inlet end in fluid communication with the discharging outlet of said conveying pump and an outlet end in fluid communication with a conduit leading to a collection station for aggregate material.

7. An apparatus according to claim 6, wherein:
(a) the trajectory confining portion of said housing is perforate to a degree permitting the escape therefrom of aggregate material of a predetermined size or less; and,
(b) said conveying pump is adapted to maintain the charging inlet thereof at a pressure greater than the ambient pressure of a body of water therearound;

and further including shielding means to prevent the collection forward of said hoe of material which escapes from said housing.

8. An apparatus according to claim 6, wherein said conveying pump is of the jet-type and includes a fluid supply section disposed upstream of and in fluid communication with said charging inlet and further including:

(a) an elongated supply conduit having one end coupled in fluid communication with said supply section and an opposite end open and disposed laterally from said one end by a distance greater than the radius of the area of water normally disturbed by said apparatus during the operation thereof as said carriage rides over the floor of a body of water; and, (b) a float secured to said supply conduit to effect buoyant support of said opposite open end.

9. An apparatus for harvesting aggregate material from the floor of a body of water, comprising:

(a) a carriage adapted to ride over the floor of a body of water;

(b) means to move said carriage in a direction riding over the floor of a body of water in forward direction;

(c) raking means supported on said carriage to assume a position in proximate contact with the floor of a body of water over which said carriage is riding, said raking means being adapted to segregate therethrough aggregate material of a predetermined size or less encountered thereby as said carriage rides over the floor of a body of water and comprising a grid extending across a forward portion of said carriage, said grid being disposed to assume contact with the floor of a body of water over which said carriage is riding and shaped to direct aggregate material too large to be segregated therethrough to at least one localized area as said carriage rides over the floor of a body of water in a forward direction;

(d) collection means supported on said carriage to receive aggregate material segregated through said raking means, said collection means comprising a hoe extending across said carriage rearwardly of said grid, said hoe being disposed to assume contact with the floor of a body of water over which said carriage is riding;

(e) propelling means adapted to discharge aggregate material received in said collection means, said means comprising a suction pump having an inlet disposed to draw aggregate material collected in said hoe and an outlet disposed to discharge said aggregate material;

(f) crushing means operatively associated with said carriage to reduce aggregate material directed to said localized area to a size capable of being segregated through said grid; and, (g) directing means to guide aggregate material reduced in size by said crushing means to receiving relationship with said hoe.

10. An apparatus according to claim 9, wherein:

(a) said grid comprises:
  (1) end portions disposed on opposite sides of said carriage; and,
  (2) a forwardly bowed intermediate portion disposed between said end portions to present a convex leading face therewith;

(b) said crushing means comprises a pair of rock crushers supported on said carriage, respectively, adjacent the end portions of said grid, said crushers each having a charging inlet in receiving relationship to the end portion of the grid adjacent thereto and a discharging outlet; and, (c) said directing means comprises lateral portions extending from said hoe to receiving relationship with the discharging outlets of said crushers.

11. An apparatus according to claim 10, wherein:

(a) said hoe comprises:
  (1) end portions disposed on opposite sides of said carriage rearwardly of said crushers; and,
  (2) a rearwardly bowed intermediate portion disposed between said end portions to present a concave leading face therewith;

(b) the inlet of said suction pump is disposed immediately forward of the rearmost area of the leading face of said hoe.

12. An apparatus according to claim 10, wherein support of said crushers on the carriage is effected through structure comprising:

(a) tension cable means secured to and between said crushers; and, (b) guide means secured to said carriage and having said cable means trained thereover and supported thereby for free axial movement relative thereto whereby lowering one of said crushers effects raising of the other and vice-versa.

13. An apparatus for harvesting aggregate material from the floor of a body of water, comprising:

(a) a carriage adapted to ride over the floor of a body of water;

(b) means to move said carriage in a direction riding over the floor of a body of water in forward direction;

(c) raking means supported on said carriage to assume a position in proximate contact with the floor of a body of water over which said carriage is riding, said raking means being adapted to segregate therethrough aggregate material of a predetermined size or less encountered thereby as said carriage rides over the floor of a body of water and comprising a grid extending across a forward portion of said carriage, said grid being disposed to assume contact with the floor of a body of water over which said carriage is riding, and being defined by first articulatively connected segments adapted to flex to accommodate contiguous contact thereof with an irregular surface of the floor of a body of water over which said carriage is riding;

(d) collection means supported on said carriage to receive aggregate material segregated through said raking means, said collection means comprising a hoe extending across said carriage rearwardly of said grid, said hoe being disposed to assume contact with the floor of a body of water over which said carriage is riding, said hoe being defined by second articulatively connected segments adapted to flex to accommodate contiguous contact thereof with an irregular surface of a body of water over which said carriage is riding;

(e) propelling means adapted to discharge aggregate material received in said collection means, said means comprising a suction pump having an inlet disposed to draw aggregate material collected in said hoe and an outlet disposed to discharge said aggregate material; and wherein, (f) said grid and hoe are supported on the carriage flexibly for raising and lowering movement relative thereto responsive to irregularities in the surface of the floor of a body of water over which said carriage is riding.

14. An apparatus according to claim 13, wherein support of said grid and hoe on the carriage is effected through structure comprising:

(a) first links secured to and extending forwardly from said hoe to secure connection with said carriage;

(b) second links extending between and secured to said grid and hoe to either side of the longitudinal centerline of said carriage;

(c) tension cable means secured to and between said second links to either side of said longitudinal centerline; and, (d) guide means secured to said carriage and having said cable means trained thereover and supported thereby for free axial movement relative thereto whereby lowering of said second links to one side of the longitudinal centerline of said carriage effects raising of said second links to the other side thereof and vice versa.

15. A system for harvesting aggregate material from the floor of a body of water, said system comprising:
(a) a harvester adapted to ride over the floor of said body of water and collect aggregate material therefrom;
(b) pump means operatively associated with said harvester to exhaust aggregate material collected thereby;
(c) first conduit means coupled in fluid communication with said pump means to receive aggregate material exhausted thereby;
(d) second conduit means coupled in fluid communication with said first conduit means to receive aggregate material therefrom, said second conduit means being elongated and adapted to assume a substantially vertical disposition with one end thereof disposed in close proximity to the surface of said body of water to effect discharge of aggregate material therefrom;
(e) a pontoon secured to said second conduit means adapted to effect buoyant support of at least part of the load thereof, said means, when in buoyant supporting condition, assuming a position at least partially exposed above the surface of said body of water;
(f) a barge adapted to assume a position disposed substantially over said second conduit means, said barge having a well thereon adapted to confine said pontoon therein;
(g) guide means cooperating between said pontoon and well to substantially prevent relative lateral movement therebetween while permitting substantially unrestricted vertical movement therebetween; and,
(h) level maintaining means cooperating between said pontoon and well to maintain said barge and pontoon horizontally level relative to each other irrespective of vertical movement therebetween.

16. A system according to claim 15, including:
(a) an elongated substantially rigid conduit having one end portion coupled in fluid communication with said one end of said second conduit means and an opposite end portion extending over said barge;
(b) first means securing said one end portion to said pontoon for support thereby; and,
(c) second means securing said opposite end portion to said barge for support thereby to provide for substantially unrestricted vertical movement of said one end portion relative to said barge while preventing relative lateral movement between said one end portion and said barge.

17. A system according to claim 16, wherein said second means comprises:
(a) a rigid pivot arm of approximately one-half the length of said rigid conduit, said arm having:
(1) one end pivotally secured to said conduit approximately mid-way between the ends thereof for movement about a first horizontal axis extending normal to said conduit; and,
(2) the other end thereof pivotally secured to said barge adjacent said well for movement about a second horizontal axis parallel to and spaced vertically from said first axis; and,
(b) a track pivotally supporting said opposite end portion on said barge at a point spaced from said first axis by a distance substantially equal to the distance between said first and second axes, said track supporting said opposite end portion for substantially unrestricted rectilinear horizontal movement relative to said barge in a vertical plane defined by said conduit and against vertical movement relative to said barge.

18. A system according to claim 15, wherein:
(a) said guide means comprises at least three vertically disposed substantially straight rails having followers engaged therewith for free rectilinear movement therealong operatively connected between said pontoon and well at substantially equal annularly spaced locations around said pontoon; and,
(b) said level maintaining means comprises:
(1) at least three vertically disposed support elements fixed relative to said well around said pontoon at substantially equal annularly spaced locations;
(2) sheaves mounted on said pontoon adjacent each of said elements; and,
(3) at least one pair of cables extending between each adjacent set of said elements, the cables in each of said pairs extending, respectively, from connections with the opposed ends of one of the elements between which they extend to oppositely disposed connections with the opposed ends of the other of said elements between which they extend and having the intermediate portions thereof trained, under tension, around sheaves disposed adjacent the elements between which they extend for guidance thereby.

19. A system for harvesting aggregate material from the floor of a body of water, said system comprising:
(a) a harvester adapted to ride over the floor of said body of water and collect aggregate material therefrom;
(b) pump means operatively associated with said harvester to exhaust aggregate material collected thereby;
(c) first conduit means coupled in fluid communication with said pump means to receive aggregate material exhausted thereby;
(d) second conduit means coupled in fluid communication with said first conduit means to receive aggregate material therefrom, said second conduit means being elongated and adapted to assume a substantially vertical disposition with one end thereof disposed in close proximity to the surface of said body of water to effect discharge of aggregate material therefrom;
(e) a pontoon secured to said second conduit means adapted to effect buoyant support of at least part of the load thereof;
(f) secondary pump means interposed in said second conduit means to effect the flow of fluid therethrough, said secondary pump means exhausting to the portion of said second conduit means thereabove through an outwardly and upwardly extending elbow conduit section; and,
(g) a relief segment formed in the lower surface of the outer radius of said section, said segment being pivotally secured at the upstream end thereof to said elbow section and balanced to assume a closed condition responsive to internal pressure created by said secondary pump means in said section and open condition permitting discharge therethrough upon cessation of internal pressure created by said secondary pump means.

20. In a combination comprising:
(I) A station located at the surface of a body of water and having therein a well in open communication with the body of water; and,
(II) A pontoon buoyantly supported in said body of water within the confines of said well;
an improved system for maintaining said pontoon in centered relationship with respect to said well, comprising:

(a) guide means comprising at least three vertically disposed substantially straight rails having followers engaged therewith for free rectilinear movement therealong operatively connected between said pontoon and well at substantially equal annularly spaced locations around said pontoon; and, (b) level maintaining means comprising:
- (1) at least three vertically disposed support elements fixed relative to said well around said pontoon at substantially equal annularly spaced locations;
- (2) sheaves mounted on said pontoon adjacent each of said elements; and,
- (3) at least one pair of cables extending between each adjacent set of said elements, the cables in each of said pairs extending respectively, from connections with the opposed ends of one of the elements between which they extend to oppositely disposed connections with the opposed ends of the other of said elements between which they extend and having the intermediate portions thereof trained, under tension, around sheaves disposed adjacent the elements between which they extend for guidance thereby.

21. An apparatus for use on the floor of a body of water, said apparatus comprising:
- (a) a body having means thereon adapted to be positioned in proximate contact with the floor of a body of water;
- (b) pontoon means of selectively variable buoyancy secured to said body to effect, at least partially, the buoyant support thereof;
- (c) buoyancy monitoring means operatively associated with said pontoon means to sense the degree of buoyancy thereof; and,
- (d) buoyancy control means to vary the buoyancy of said pontoon means responsive to said monitoring means to maintain said buoyancy within predetermined limits.

22. An apparatus according to claim 21, including:
- (a) level monitoring means operatively associated with said body to sense the horizontal disposition thereof;
- (b) selectively operable level effecting means supported on said body to effect the levelling thereof; and,
- (c) control means operatively associated with said level monitoring and level effecting means to effect selective operation of said level effecting means responsive to said level monitoring means to maintain said body in a substantially horizontal disposition.

References Cited
UNITED STATES PATENTS

| | | | |
|---|---|---|---|
| 813,935 | 2/1906 | Avery | 37—56 |
| 1,220,197 | 3/1917 | Cowles | 37—54 XR |
| 3,248,812 | 5/1966 | Gardner | 37—61 |
| 3,310,894 | 3/1967 | Ball | 37—57 XR |

ROBERT E. PULFREY, *Primary Examiner.*

CLIFFORD D. CROWDER, *Assistant Examiner.*

U.S. Cl. X.R.

37—61, 72